Feb. 23, 1960 J. C. GAVIN 2,925,710
VARIABLE AREA JET NOZZLE CONTROL
Filed Feb. 23, 1956 2 Sheets-Sheet 1

INVENTOR.
John C. Gavin
BY
ATTORNEYS

Feb. 23, 1960

J. C. GAVIN 2,925,710

VARIABLE AREA JET NOZZLE CONTROL

Filed Feb. 23, 1956

INVENTOR.
John C. Gavin
BY
Arthur N. Collins
Attorney

2,925,710

VARIABLE AREA JET NOZZLE CONTROL

John C. Gavin, Glastonbury, Conn., assignor, by mesne assignments, to the United States of America as represented by the Secretary of the Navy Application February 23, 1956, Serial No. 567,421

6 Claims. (Cl. 60—35.6)

This invention relates to a variable area jet nozzle control for afterburners of jet engines.

An analysis of the operational necessities of advanced jet engines equipped with afterburners discloses that the study of the variable area jet nozzle requirements for hot afterburning has indicated the desirability of scheduling area as a function of the overall jet nozzle pressure ratio. To accomplish this result, it is necessary to use a control unit which is capable of scheduling as a funtion of pressure ratio. In the past, this was accomplished by a system of bellows and bell cranks requiring a multiple of mechanical connections resulting in poor functioning.

This invention proposes to schedule the jet nozzle area as a function of pressure ratio by a self-contained pressure ratio indicator. The indicator is exposed to the flow of gases from the engine compressor which enter it through a converging-diverging inlet and pass through the indicator. A fixed bleed port is exposed to the flow at the diverging portion of the nozzle and this bleed port controls a single flexible diaphragm which operates a movable pintle and the air servo valve. The remainder of the linkage around the nozzle area is typical of any scheduling feed back control system.

It is an object of this invention to schedule jet nozzle area as a function of pressure ratio by a self-contained pressure ratio indicator.

It is another object of this invention to provide a self contained pressure ratio indicator wherein a flexible diaphragm, responsive to the changes in pressure, drives the jet nozzle area controls.

Other objects and many of the attendant advantages of this invention will be readily appreciated as the same becomes better understood by reference to the following detailed description when considered in connection with the accompanying drawings wherein:

Figure 1 is a cross-sectional view of a converging-diverging nozzle which is utilized in the invention.

Figure 2 discloses a graphic representation of curve characteristics obtained from information of pressures in Figure 1.

Figure 4 is a view of the control unit relative to the aircraft.

Figure 1:
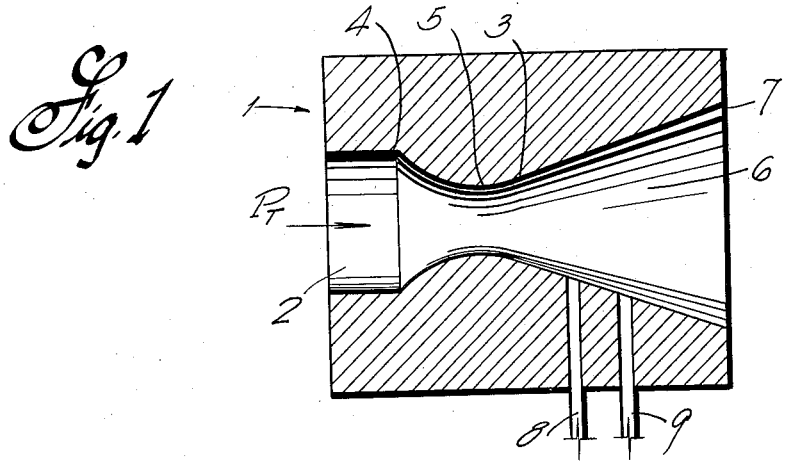

In Figure 1, there is disclosed a converging-diverging nozzle 1 the flow through which is supersonic. The nozzle is formed with a central aperture having a cylindrical section 2 in one end which is connected to an asymmetrical section 3 in the other end. The section 3 has a converging portion 4 adjacent the cylindrical section that tapers to a point 5 of minimum convergence and a diverging portion 6 that increases to a maximum opening 7. The pressure of the air flow upon entering the nozzle is represented by $Pt$ while the symbol, $Pamb$, represents the pressure of the air flow emanating from the nozzle. Located in the wall section of the diverging portion 6 are two static wall taps 8 and 9 with the tap 9 having the larger cross-sectional area.

Figure 2:
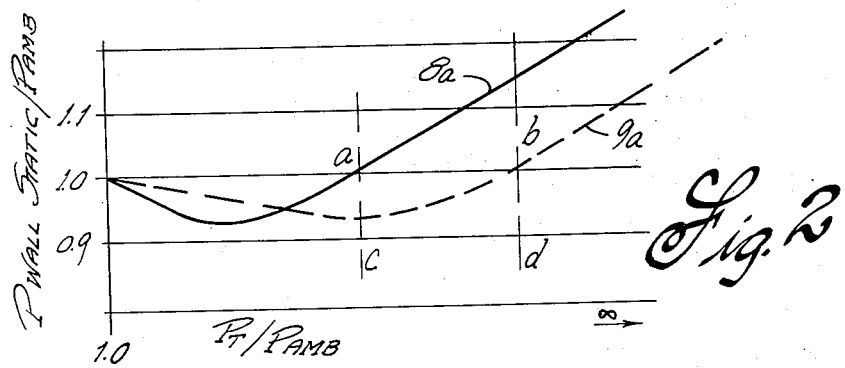

In Figure 2, there is disclosed a graph depicting the relationship between P wall static and $Pamb$ as compared to that of $Pt$ and $Pamb$. Increasing the overall pressure ratio ($Pt/Pamb$) produces relationship as indicated for static pressure ratio of wall taps 8 and 9. Each of these curves 8a and 9a crosses the P wall static/$Pamb=1.0$ value only once at $a$ and $b$. Since under this condition P wall static=$Pamb$, it can be used as a null point with a diaphragm. An increase or decrease in pressure ratios will result in an unbalanced force with opposite direction across the diaphragm. From the above information a pressure ratio indicator can be built wherein an infinite number of curves can be realized for a fixed tap with a variable position pintle. Thus, a linear position of the pintle will indicate a particular overall pressure and by the proper contouring of the nozzle and pintle non linear relationships may be obtained. The variable position pintle may be located by the feedback of the loaded diaphragm.

Figure 3:
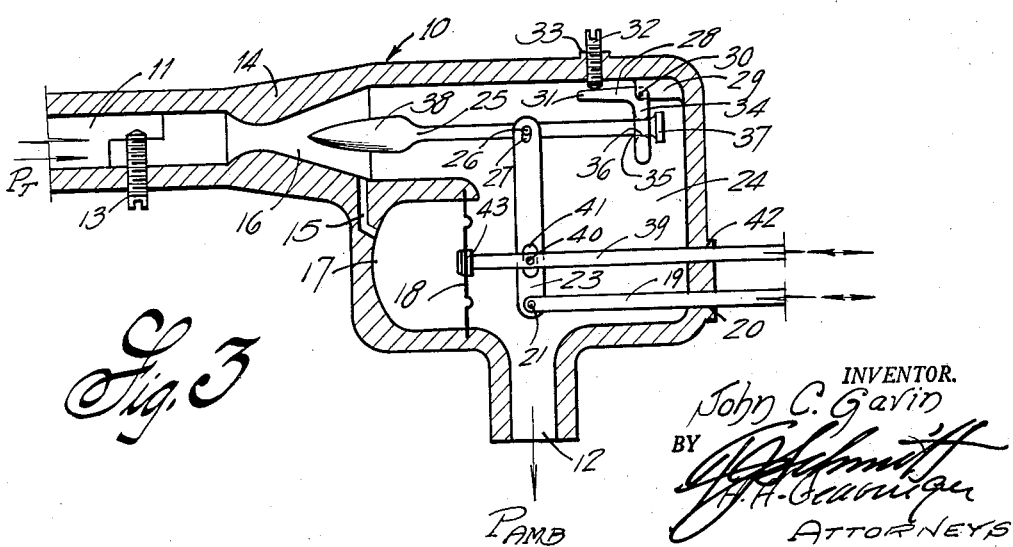
Figure 3 is a cross-sectional view of a form of the invention.
Figure 2:
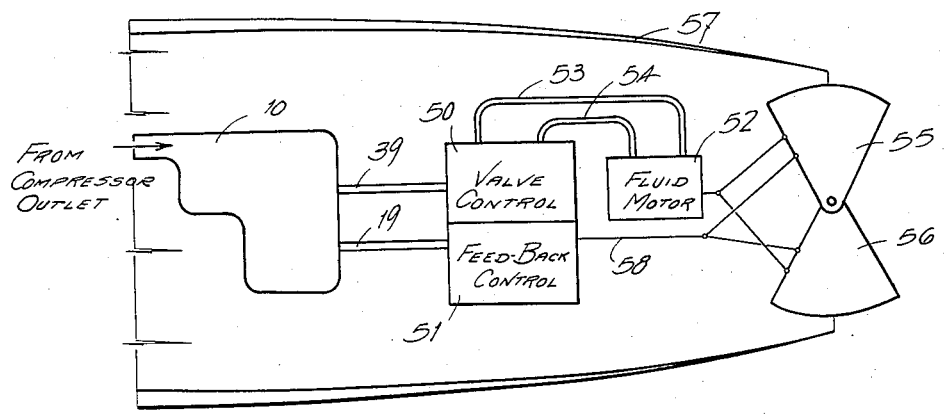

With reference to Figure 3, there is disclosed a pressure ratio indicator encompassing the above characteristics. A hollow housing generally indicated at 10 has an inlet 11 for receiving the compressor airflow and an outlet 12. The pressure $Pt$ is measured at the inlet and the pressure $Pamb$, at the outlet. A set screw 13 in the inlet is used for trim setting. Adjacent the inlet 11, the housing 10 is formed with a converging-diverging nozzle 14 similar to that of Figure 1. A wall tap 15 in the housing is in communication with the diverging portion 16 of the nozzle. The tap 15 serves as a bleed pressure line and is in communication with a pocket 17 formed in one side wall of the housing and closed by the diaphragm 18.

A jet nozzle feed back rod 19 is mounted for longitudinal sliding motion through an opening 20 in the side wall of the housing. Pivotally connected to the rod 19 by the pivot pin 21 is a crosslink 23 which extends through the cavity 24 in the housing and is pivotally and slideably connected to the variable pintle 25 by a pin 26 on the pintle and a slot 27 in the crosslink.

An L-shaped member 28 is pivotally mounted on a boss 29 in the housing by the pin 30. One arm 31 of the member cooperates with an adjustable set screw 32 threadedly mounted through the top wall 33 of the housing to form a low pressure ratio stop. In the other arm 34 of the L-shaped member 28, there is an opening 35 that slideably receives the pintle 25. This opening 35 is formed by two semi-circular bearing portions 36 that will provide a uniform opening for receiving the pintle in any position of the pivoted member 28. An enlarged portion 37 on the pintle 25 prevents the withdrawal of the pintle from the opening and acts to urge the arm 31 against the set screw 32. The pintle is also formed with a curved head 38 that is located in the diverging end of the nozzle 14 and serves to regulate the overall pressure.

Mounted between the ends of the crosslink 23 is an arm 39 which is pivotally and slideably connected to the crosslink by a pin 40 on the arm and a slot 41 in the crosslink. The arm 39 is mounted for longitudinal sliding movement through the opening 42 in the side wall of the housing. One end 43 of the arm is connected to the flexible diaphragm 18. Movement of the arm 39 is actuated by the diaphragm 18 which is responsive to the variations in pressure. The arm 39 controls the air servo valve which adjusts the jet nozzle area. Movement of the arm 39 to the right as viewed in Figure 3 will increase jet nozzle size while movement of the rod 19 to the left will increase the jet nozzle size.

The control unit 10 (Fig. 4) is mounted adjacent the aircraft casing 57. Servo valve control unit 50 is connected to the feedback control unit 51. Nozzle segments 55, 56 are connected to the fluid motor unit 52, which unit is coupled to unit 50 by control lines 53, 54. The feedback control is connected to the segments 55, 56 via linkage assembly 58. The cooperation of control and feedback units 50, 51 and the variable nozzle segments is conventional and well-known.

To illustrate the operation of the device, the pintle 25 is assumed to be in a position to perform with the characteristics of line 8a of Figure 2. The pressure ratio is such that no unbalanced load is placed on the diaphragm 18. Increasing the pressure ratio ($Pt/Pamb$) instantaneously as from line c to line d of Figure 2 would exert an unbalanced force on the diaphragm 18 due to the increased pressure through the wall tap 15 which causes the arm 39 and hence the air servo system to move toward the right. At this instant, the jet nozzle feed back system is stationary so that movement of the arm 39 to the right causes the pintle 25 to move to the right. The new position of pintle 25 will result in the relationship having the characteristics of curve 9a of Figure 2 which will reduce the unbalance across the diaphragm 18. The servo system will increase the jet nozzle size which will cause the jet nozzle feed back system and in particular rod 19 to move to the left until the diaphragm loading rig is balanced. When the rod 19 is in the new and balanced position, there will be no unbalanced force on the diaphragm 18 so that it will return together with the air servo system to its balanced or null position. Since the air servo system is of the double acting type, reduction in the overall pressure ratio will reverse the procedure.

As the pressure ratio ($Pt/Pamb$) is reduced, the pintle 25 moves to the left as viewed in Figure 3. Also, rod 19 moves to the right as the jet nozzle is closed. As a predetermined point of minimum pressure is reached, the lever arm 31 abuts against the low pressure ratio stop 32 and further movement of the pintle to the left is prevented. Since the air servo system is in a null position and the pintle is stopped, it is necessary that at this point the jet nozzle be in a minimum afterburning position. If the jet nozzle strays from its designed position, either open or closed, at a predetermined pressure ratio, an error is indicated in the air servo valve in the direction of correction. Under normal conditions, the load on the diaphragm acts to the left for reduced pressure ratios and consequently keep the pintle 25 against the stop. Cold afterburner jet nozzle operation is handled by an override on the air servo system to keep full pressure on one side of the exhaust nozzle pistons.

Obviously many modifications and variations of the present invention are possible in the light of the above teachings. It is therefore to be understood that within the scope of the appended claims the invention may be practiced otherwise than as specifically described.

What is claimed is:

1. A variable area jet nozzle control comprising an engine compressor, a housing having a converging-diverging supersonic air inlet connected to said compressor for receiving air flow from said compressor and an outlet, a pintle movably mounted adjacent the divergent portion of said inlet for varying the inlet area and adapted to assume a predetermined position for every ratio of inlet to outlet pressures, said housing having an inner pocket, a bleed pressure tap line in one wall of the housing communicatively connecting the diverging portion of said inlet to said pocket, a flexible diaphragm covering said pocket and responsive to changes in ratio of inlet to outlet pressures, link means connecting said diaphragm to said pintle for movement thereof with motion of said diaphragm, means connected to said diaphragm for regulating jet nozzle area, and means responsive to changes in jet nozzle area for resetting said pintle.

2. A variable area jet nozzle control comprising a compressor, a self contained housing having a supersonic air inlet connected to said compressor for receiving supersonic air flow from said compressor, an outlet, a pintle movably mounted adjacent said inlet, means responsive to the variations in ratio of inlet to outlet pressures for controlling jet nozzle area, means connecting said last named means to said pintle for movement thereof to a predetermined position for every ratio of inlet to outlet pressures, and means responsive to changes in jet nozzle area for resetting the pintle into another predetermined position.

3. A variable area jet nozzle control as in claim 2 wherein the means responsive to variations in ratio of inlet to outlet pressures comprise a bleed pressure tap line in one wall of the housing in communication with the air inlet and a pocket in the one wall of the housing, a flexible diaphragm covering the pocket and an arm slideably mounted through another wall of the housing and connected at one end to the flexible diaphragm and adapted at the other end to be connected to jet nozzle area regulating means.

4. A variable area jet nozzle control as in claim 3 wherein the means responsive to the jet nozzle area for resetting the pintle comprise a jet nozzle feed back rod slideably mounted through the second mentioned housing wall, a cross-link pivotally mounted at one end on the rod and at the other end to the pintle and a pivotal connection between the cross-link and the arm intermediate the ends of the cross-link whereby the position of the pintle is governed by the position of the rod at a null position of the diaphragm.

5. A variable area jet nozzle control as in claim 4 and further including a low pressure ratio stop limiting the movement of the pintle.

6. In a jet engine having a variable area nozzle, means for varying the area of said nozzle, a feed back control means responsive to the area change of said nozzle, and a source of air pressure, a variable jet nozzle control comprising a housing having a supersonic air inlet with a portion diverging into said housing and an outlet, said inlet being communicatively connected to said source of air pressure, a pocket in said housing, a bleed line connecting said pocket to said inlet at the diverging portion, a diaphragm covering said pocket, a pintle movably mounted in said diverging portion of said inlet for varying the area thereof, link means connecting said pintle to said diaphragm for movement therewith, arm means slideably mounted through the wall of said housing and connected at one end to said diaphragm and at the other end to said means for varying the area of said nozzle whereby nozzle area is varied with diaphragm movement, and means connecting said feed back control means to said pintle whereby said pintle is positioned in response to nozzle area change.

References Cited in the file of this patent

UNITED STATES PATENTS

| | | |
|---|---|---|
| 436,235 | Griffin | Sept. 9, 1890 |
| 2,537,772 | Lundquist et al. | Jan. 9, 1951 |
| 2,749,749 | Billman et al. | June 12, 1956 |
| 2,767,725 | Long | Oct. 23, 1956 |
| 2,774,374 | Schneider | Dec. 18, 1956 |
| 2,778,191 | Thompson | Jan. 22, 1957 |
| 2,818,703 | Victor | Jan. 7, 1958 |
| 2,864,393 | Drake | Dec. 16, 1958 |

FOREIGN PATENTS

| | | |
|---|---|---|
| 222,951 | Great Britain | Oct. 10, 1924 |
| 646,780 | Great Britain | Nov. 29, 1950 |

OTHER REFERENCES

Rocket Propulsion Elements, by Sutton, 2nd edition, copyright 1956, by John Wiley & Sons, Inc., pages 71–73.